United States Patent
Athley et al.

(10) Patent No.: US 10,455,601 B2
(45) Date of Patent: Oct. 22, 2019

(54) CO-SCHEDULING OF WIRELESS DEVICES

(71) Applicant: Telefonaktiebolaget LM Ericsson (publ), Stockholm (SE)

(72) Inventors: Fredrik Athley, Kullavik (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 91 days.

(21) Appl. No.: 15/315,131

(22) PCT Filed: Nov. 17, 2016

(86) PCT No.: PCT/EP2016/077995
§ 371 (c)(1),
(2) Date: Nov. 30, 2016

(87) PCT Pub. No.: WO2018/091092
PCT Pub. Date: May 24, 2018

(65) Prior Publication Data
US 2018/0220436 A1 Aug. 2, 2018

(51) Int. Cl.
*H04W 72/12* (2009.01)
*H04B 7/0452* (2017.01)
(Continued)

(52) U.S. Cl.
CPC ........ *H04W 72/121* (2013.01); *H04B 7/0452* (2013.01); *H04L 1/0026* (2013.01);
(Continued)

(58) Field of Classification Search
CPC .. H04B 7/0617; H04B 7/0456; H04B 7/0639; H04B 7/0663; H04B 7/0626;
(Continued)

(56) References Cited

U.S. PATENT DOCUMENTS

| 9,735,940 B1* | 8/2017 | Bakr | H04L 5/0053 |
| 2003/0151553 A1* | 8/2003 | Ylitalo | H01Q 1/246 |
| | | | 342/422 |

(Continued)

FOREIGN PATENT DOCUMENTS

| EP | 1 641 188 A1 | 3/2006 |
| WO | 2011055137 A1 | 5/2011 |

OTHER PUBLICATIONS

International Search Report and Written Opinion issued in Application No. PCT/EP2016/077995 dated Aug. 18, 2017, 14 pages.
(Continued)

*Primary Examiner* — Oussama Roudani
(74) *Attorney, Agent, or Firm* — Rothwell, Figg, Ernst & Manbeck, P.C.

(57) ABSTRACT

There is provided mechanisms for co-scheduling wireless devices in a communications network. A method is performed by a network node. The method comprises obtaining first directional information indicating direction of transmission to a first wireless device. The method comprises obtaining second directional information indicating direction of transmission to a second wireless device. The method comprises rejecting a hypothesis of co-scheduling the first wireless device and the second wireless device when at least one of the direction of the second wireless device and angular spread of the direction to the second wireless device is within angular spread of the direction to the first wireless device.

21 Claims, 5 Drawing Sheets

(51) Int. Cl.
*H04W 72/04* (2009.01)
*H04L 1/00* (2006.01)
*H04W 4/02* (2018.01)
*H04W 64/00* (2009.01)
*H04L 5/00* (2006.01)

(52) U.S. Cl.
CPC ......... *H04W 4/027* (2013.01); *H04W 64/006* (2013.01); *H04W 72/048* (2013.01); *H04L 5/0023* (2013.01)

(58) Field of Classification Search
CPC .. H04B 7/0634; H04B 7/0408; H04B 7/0695; H04L 2025/03426; H04L 2025/03808; H04L 25/03343
See application file for complete search history.

(56) References Cited

U.S. PATENT DOCUMENTS

| | | | | |
|---|---|---|---|---|
| 2005/0157683 | A1* | 7/2005 | Ylitalo | H04B 7/0634 370/334 |
| 2006/0067269 | A1* | 3/2006 | Jugl | H04W 72/121 370/329 |
| 2011/0164668 | A1* | 7/2011 | Hoek | H04B 7/0619 375/224 |
| 2011/0281600 | A1* | 11/2011 | Tanaka | H04B 7/024 455/500 |
| 2012/0113830 | A1* | 5/2012 | Zhu | H04B 7/024 370/252 |
| 2013/0034040 | A1 | 2/2013 | Priotti | |
| 2013/0272548 | A1* | 10/2013 | Visser | G06K 9/00624 381/122 |
| 2017/0019154 | A1* | 1/2017 | Reed | H04B 7/043 |
| 2017/0054482 | A1* | 2/2017 | Forenza | H04B 7/0456 |

OTHER PUBLICATIONS

Wei-Liang Shen et al. "Rate Adaptation for 802.11 Multiuser MIMO Networks", IEEE Transactions on Mobile Computing, vol. 13, No. 1, Jan. 2014, IEEE Service Center, Los Alamitos, CA, US; XP011532741, pp. 35-47.

Bernard H. Fleury: "First- and Second-Order Characterization of Direction Dispersion and Space Selectivity in the Radio Channel", IEEE Transactions of Information Theory, vol. 46, No. 6, Sep. 6, 2000, 18 pages.

"Guidelines for evaluation of radio interface technologies for IMT-Advanced", International Telecommunication Union, Report ITU-R M.2135-1, M Series, Mobile, radiodetermination, amateur and related satellites services, Dec. 2009, 72 pages.

* cited by examiner

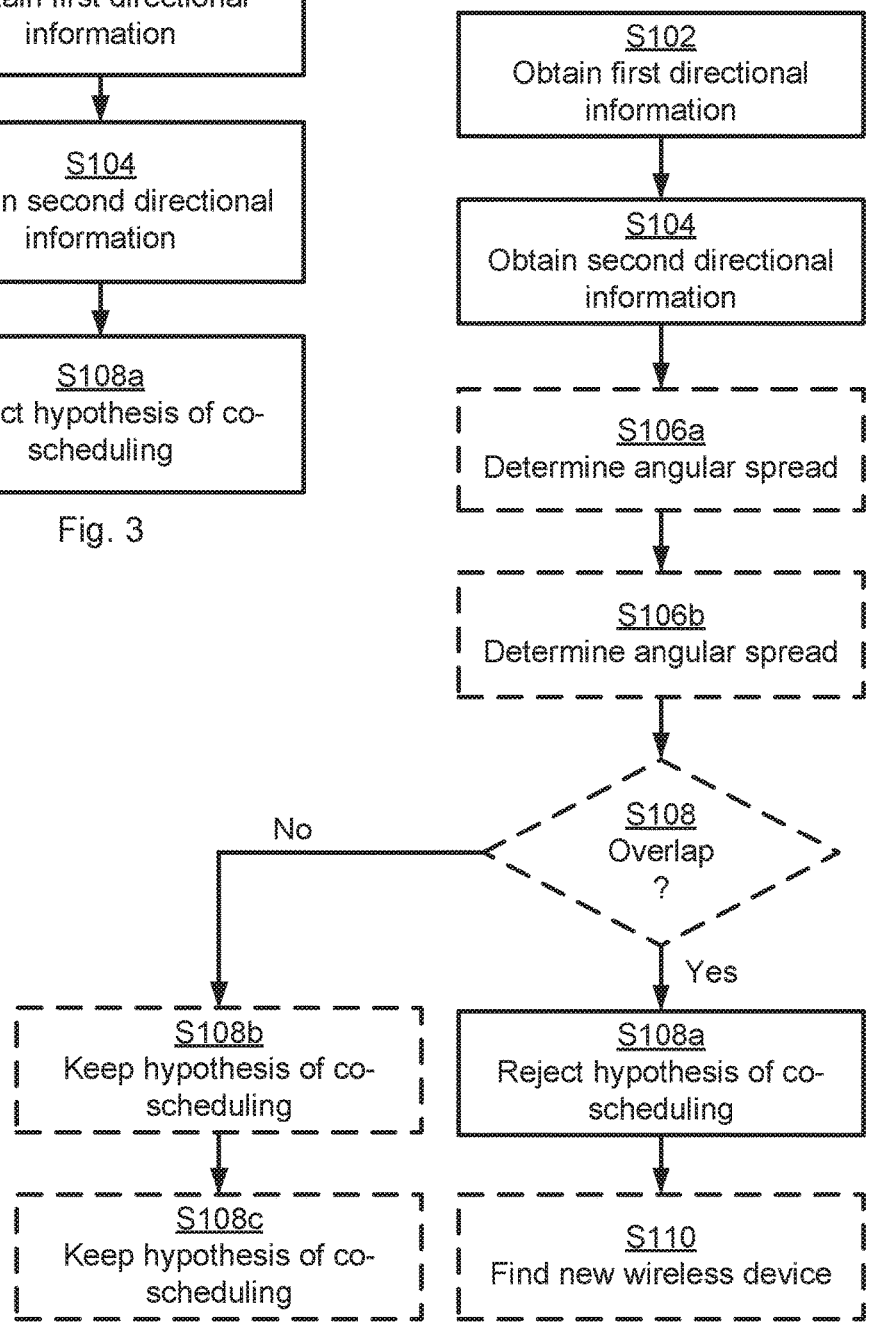

US 10,455,601 B2

CO-SCHEDULING OF WIRELESS DEVICES

CROSS REFERENCE TO RELATED APPLICATION

This application is a 35 U.S.C. § 371 National Stage of International Application No. PCT/EP2016/077995, filed Nov. 17, 2016, designating the United States, the disclosure of which is incorporated by reference.

TECHNICAL FIELD

Embodiments presented herein relate to a method, a network node, a computer program, and a computer program product for co-scheduling wireless devices in a communications network.

BACKGROUND

In communications networks, there may be a challenge to obtain good performance and capacity for a given communications protocol, its parameters and the physical environment in which the communications network is deployed.

For example, multi-antenna techniques have the potential to increase the data rates and reliability of a wireless communications network. The transmitter and the receiver are equipped both being provided with multiple antennas results in a multiple-input multiple-output (MIMO) communication channel.

The Long Term Evolution (LTE) standard is currently evolving with enhanced MIMO support. One component in LTE is the support of MIMO antenna deployments and MIMO related techniques. Currently LTE-Advanced supports an 8-layer spatial multiplexing mode for 8 transmitter antennas with channel dependent precoding. The spatial multiplexing mode is aimed for high data rates in favorable channel conditions. An illustration of a transmission point 120 configured for such a spatial multiplexing operation is provided in FIG. 1.

As seen in FIG. 1, an information carrying symbol vectors of rank r (as represented by Layer 1, Layer 2, . . . , Layer r) is multiplied by an $N_T$-by-r precoder matrix W, which serves to distribute the transmit energy in a subspace of an $N_T$-dimensional vector space (corresponding to $N_T$ antenna ports) via respective inverse fast Fourier transform (IFFT) blocks. The precoder matrix could be selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r could be adapted to suit the current channel properties.

LTE uses orthogonal frequency-division multiplexing (OFDM) in the downlink (i.e., from the transmission point in the communications network to served wireless devices) and discrete Fourier transform (DFT) precoded OFDM in the uplink (i.e., from the wireless devices to the transmission point) and hence the received $N_R$-by-1 vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or be a frequency selective precoder.

The precoder matrix W is can be selected to match the characteristics of the $N_R$-by-$N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

In closed-loop precoding for the LTE downlink, the wireless device transmits, based on channel measurements in the forward link (downlink), recommendations to the network node controlling the transmission point of a suitable precoder to use. The network node configures the wireless device to provide feedback according to the transmission mode used by the wireless device, and may transmit channel state information—reference signals (CSI-RS) and configure the wireless device to use measurements of CSI-RS to feed back recommended precoding matrices that the wireless device selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other information than recommended precoders to assist the network node in subsequent transmissions to the wireless device. Such other information may include channel quality indicators (CQIs) as well as transmission rank indicator (RI).

Given the CSI feedback from the wireless device, the network node determines the transmission parameters it wishes to use to transmit to the wireless device, including the precoding matrix, transmission rank, and modulation and coding scheme (MCS). These transmission parameters may differ from the recommendations the wireless device makes. Therefore a rank indicator and MCS may be signaled in downlink control information (DCI), and the precoding matrix can be signaled in DCI or the network node could transmit a demodulation reference signal from which the equivalent channel can be measured. The transmission rank, and thus the number of spatially multiplexed layers, is reflected in the number of columns of the precoder W. For efficient performance, a transmission rank that matches the channel properties should be selected.

With multi-user MIMO, two or more wireless devices served by the same transmission point are co-scheduled on the same time-frequency resource. That is, two or more independent data streams are transmitted to different wireless devices at the same time, and the spatial domain is used to separate the respective streams. By transmitting several streams simultaneously, the capacity of the communications network can be increased. This could reduce the signal-to-interference-plus-noise ratio (SINR) per data stream since the power has to be shared between data streams and the transmissions of the data streams could cause interference to each-other.

When increasing the antenna array size, the increased beamforming gain could lead to higher SINR. The multiplexing gain increases linearly with the number of multiplexed wireless devices. Thus, as the user throughput depends only logarithmically on the SINR (for large SINRs), it could be beneficial to trade the gains in SINR for the multiplexing gain.

Accurate CSI is required in order for the network node to perform appropriate nullforming between co-scheduled wireless devices (i.e. in order to achieve that transmissions to co-scheduled wireless devices do not mutually interfere with each other). In the current LTE Rel. 13 standard, no special CSI feedback mode for multi-user MIMO (MU-MIMO) exists and thus, feedback-based MU-MIMO scheduling and precoder construction has to be based on the existing CSI reporting designed for single-user MIMO (that is, a PMI indicating a DFT-based precoder, a RI and a CQI). Thus, pairing of wireless devices for MU-MIMO and the corresponding link adaptation has to be based on the reported PMI and may for example be derived by calculating the orthogonality of the reported precoders for each user. However, PMI reports are not reliable in multi-user MIMO scenarios where two or more wireless devices are co-scheduled.

Hence, there is still a need for improved mechanisms for co-scheduling wireless devices in a communications network.

SUMMARY

An object of embodiments herein is to provide efficient co-scheduling of wireless devices in a communications network.

According to a first aspect there is presented a method for co-scheduling wireless devices in a communications network. The method is performed by a network node. The method comprises obtaining first directional information indicating direction of transmission to a first wireless device. The method comprises obtaining second directional information indicating direction of transmission to a second wireless device. The method comprises rejecting a hypothesis of co-scheduling the first wireless device and the second wireless device when at least one of the direction of the second wireless device and angular spread of the direction to the second wireless device is within angular spread of the direction to the first wireless device.

Advantageously, by enabling certain co-scheduling hypothesis to be rejected, this enables efficient co-scheduling of wireless devices in the communications network.

Advantageously this method enables better MU-MIMO performance by taking angular spread in the propagation channel into account when making co-scheduling decisions.

According to a second aspect there is presented a network node for co-scheduling wireless devices in a communications network. The network node comprises processing circuitry. The processing circuitry is configured to cause the network node to obtain first directional information indicating direction of transmission to a first wireless device. The processing circuitry is configured to cause the network node to obtain second directional information indicating direction of transmission to a second wireless device. The processing circuitry is configured to cause the network node to reject a hypothesis of co-scheduling the first wireless device and the second wireless device when at least one of the direction of the second wireless device and angular spread of the direction to the second wireless device is within angular spread of the direction to the first wireless device.

According to a third aspect there is presented a network node for co-scheduling wireless devices in a communications network. The network node comprises processing circuitry and a storage medium. The storage medium stores instructions that, when executed by the processing circuitry, cause the network node to perform operations, or steps. The operations, or steps, cause the network node to obtain first directional information indicating direction of transmission to a first wireless device. The operations, or steps, cause the network node to obtain second directional information indicating direction of transmission to a second wireless device. The operations, or steps, cause the network node to reject a hypothesis of co-scheduling the first wireless device and the second wireless device when at least one of the direction of the second wireless device and angular spread of the direction to the second wireless device is within angular spread of the direction to the first wireless device.

According to a fourth aspect there is presented a network node for co-scheduling wireless devices in a communications network. The network node comprises an obtain module configured to obtain first directional information indicating direction of transmission to a first wireless device. The network node comprises an obtain module configured to obtain second directional information indicating direction of transmission to a second wireless device. The network node comprises a reject module configured to reject a hypothesis of co-scheduling the first wireless device and the second wireless device when at least one of the direction of the second wireless device and angular spread of the direction to the second wireless device is within angular spread of the direction to the first wireless device.

According to a fifth aspect there is presented a computer program for co-scheduling wireless devices in a communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3 and 4 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
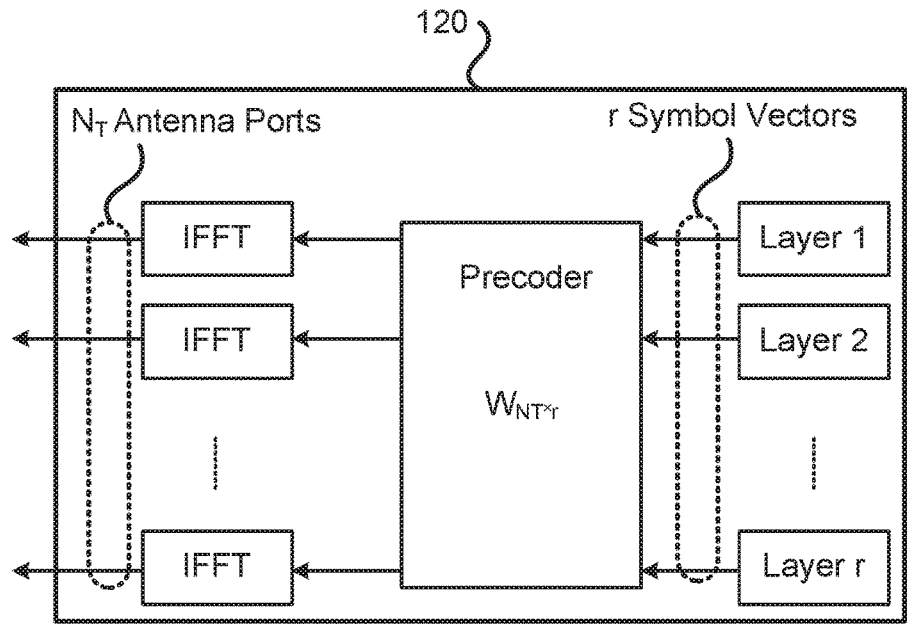
FIG. 1 schematically illustrates a transmission point according to an embodiment.
Figure 2:
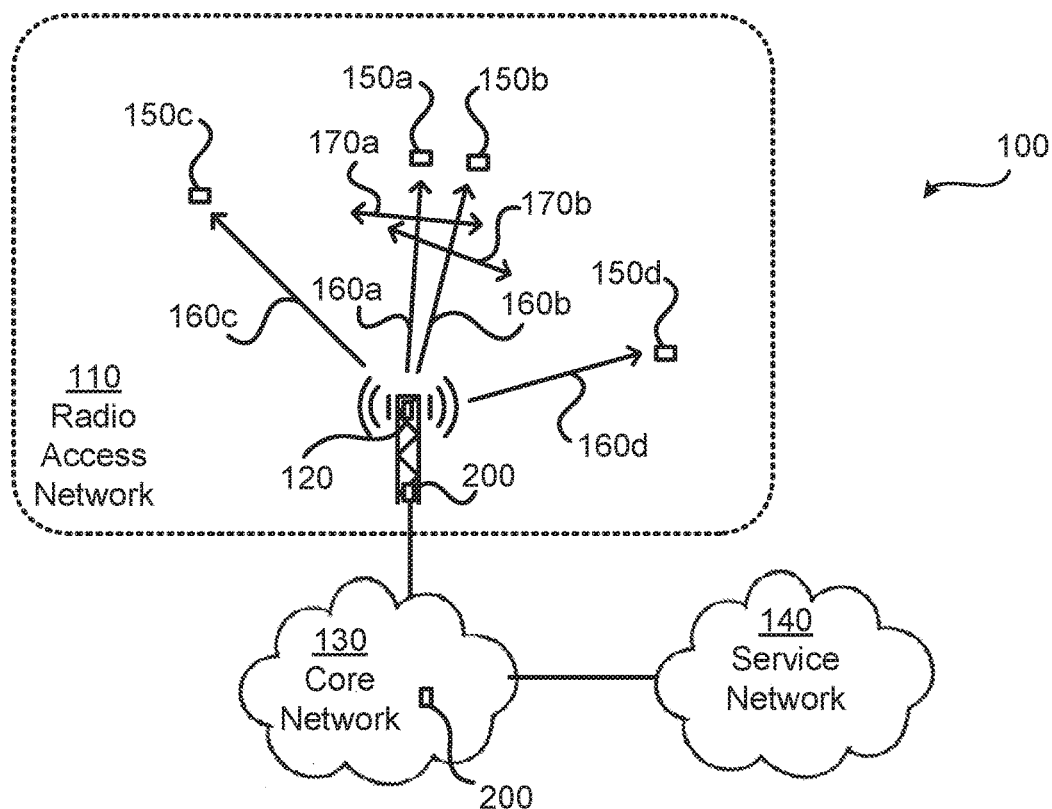
FIG. 2 is a schematic diagram illustrating a communications network according to embodiments.

FIG. 2 is a schematic diagram illustrating a communications network 100 where embodiments presented herein can be applied. The communications network 100 comprises a radio access network no, a core network 130, and a service network 140.

The radio access network no comprises at least one transmission point 120 and is operatively connected to the core network 130 which in turn is operatively connected to the service network 140. The radio access network node 120 thereby enables wireless devices 150a, 150b, 150c, 150d to access services and exchange data as provided by the service network 140. The transmission point 120 is controlled by a network node 200.

Examples of transmission points 120 include, but are not limited to, remote radio heads, remote radio units, and remote radio equipment. The transmission point 120 comprises, for example, radio frequency circuitry, analogue-to-digital/digital-to-analogue converters and up/down converters.

Examples of wireless devices 150a, 150b, 150c, 150d include, but are not limited to, mobile stations, mobile phones, handsets, wireless local loop phones, user equipment (UE), smartphones, laptop computers, tablet computers, sensors, modems, repeaters, and network equipped Internet of Things devices.

Examples of network nodes 200 include, but are not limited to, radio base stations, base transceiver stations, node Bs, evolved node Bs, and access points.

As the skilled person understands, the communications network 100 may comprise a plurality of transmission points 110, each providing network access to a plurality of wireless devices 150a, 150b, 150c, 150d. The herein disclosed embodiments are not limited to any particular number of in transmission points no, or wireless devices 150a, 150b, 150c, 150d.

The signals transmitted by the transmission point 120 to the wireless devices 150a, 150b, 150c, 150d in respective directions 160a, 160b, 160c, 160d are spread due to properties of the radio propagation channel. Hence, the signals are spread, and thus propagate, also outside the intended directions 160a, 160b, 160c, 160d. Each direction may therefore be associated with an angular spread. The angular spread for the directions 160a, 160b to wireless devices 150a, 150b are in FIG. 2 schematically illustrated at reference numerals 170a and 170b, respectively. In this respect, each signal may reach one of the wireless devices 150a, 150b, 150c, 150d in more than one angle of arrival.

The communications network 100 is preferably a frequency-division duplex (FDD) communications network but could alternatively be a time-division duplex (TDD) communications network.

In FDD communications networks the complex channel state is not reciprocal due to the frequency difference between uplink and downlink. However, the angular power spectrum can be expected to be reciprocal since the angular power spectrum is mainly based on large-scale physical objects and hence does not change due to small differences in frequency.

Downlink co-scheduling decisions for FDD MU-MIMO can be based both on feedback and reciprocity. Feedback can be used for tracking channel state variations due to fast fading and reciprocity can be used to model the average spatial characteristics of the channel.

The embodiments disclosed herein relate to mechanisms for co-scheduling wireless devices 150a, 150b, 150c, 150d in a communications network mo. In order to obtain such mechanisms there is provided a network node 200, a method performed by the network node 200, a computer program product comprising code, for example in the form of a computer program, that when run on a network node 200, causes the network node 200 to perform the method.

As disclosed above, pairing of wireless devices for MU-MIMO is currently based on reported PMI of the wireless devices. According to embodiments disclosed herein also the angular spread 170a, 170b as caused by the radio propagation channel and as seen by the transmission point 120 is taken into account when determining whether to co-schedule wireless devices.

FIGS. 3 and 4 are flow charts illustrating embodiments of methods for co-scheduling wireless devices 150a, 150b, 150c, 150d in a communications network 100. The methods are performed by the network node 200. The methods are advantageously provided as computer programs 1220.

Reference is now made to FIG. 3 illustrating a method for co-scheduling wireless devices 150a, 150b, 150c, 150d in a communications network 100 as performed by the network node 200 according to an embodiment.

Whether to co-schedule two (or more) candidate wireless devices 150a, 150b is based on angular information of the candidate wireless devices 150a, 150b to be co-scheduled. Hence, the network node 200 is configured to perform steps S102, S104:

S102: The network node 200 obtains first directional information indicating direction 160a of transmission to a first wireless device 150a.

S104: The network node 200 obtains second directional information indicating direction 160b of transmission to a second wireless device (150b).

When making the co-scheduling decisions (i.e., either accepting or rejecting a hypothesis of co-scheduling the two (or more) candidate wireless devices 150a, 150b), the angular spread of the radio propagation channel is taken into account. Particular, the angular spread is used to restrict the set of possible candidates of wireless devices to co-schedule. Hence, the network node 200 is configured to perform step S108a:

S108a: The network node 200 rejects a hypothesis of co-scheduling the first wireless device 150a and the second wireless device 150b when at least one of the direction 160b of the second wireless device 150b and angular spread 170b of the direction 160b to the second wireless device 150b is within angular spread 170a of the direction 160a to the first wireless device 150a.

Here, each of the angular spreads 170a, 170b is seen by the transmission point 120 and gives rise to a respective angular interval defining a so-called forbidden angular interval. Based on the angular spread, one or more forbidden angular intervals can thus be defined. The direction 160b of transmission to the second wireless device 150b and/or the angular interval of the second wireless device 150b is thus not allowed to be located within the forbidden angular interval of the first wireless device 150a if the second wireless device 150b is to be co-scheduled with the first wireless device 150a, and vice versa.

The hypothesis is thus rejected if the direction 160b of transmission to the second wireless device 150b is within the (forbidden) angular interval defined by the angular spread 170a of the direction 160a of transmission to the first wireless device 150a. Further, the hypothesis is thus rejected if the (forbidden) angular interval defined by the angular spread 170a of the first wireless device 1503 and the (forbidden) angular interval defined by the angular spread 170b of the second wireless device 150b overlap. Thus, a hypothesis could be rejected even if neither of the directions of the wireless devices lies within the (forbidden) angular spread of the other wireless device.

Embodiments relating to further details of co-scheduling wireless devices 150a, 150b, 150c, 150d in a communications network 100 as performed by the network node 200 will now be disclosed.

Reference is now made to FIG. 4 illustrating methods for co-scheduling wireless devices 150a, 150b, 150c, 150d in a communications network 100 as performed by the network node 200 according to further embodiments. It is assumed that steps S102, S104, S108a are performed as described above with reference to FIG. 3 and a thus repeated description thereof is therefore omitted Step S108a could be regarded as being part of a general step S108 in which the network node 200 checks whether the direction 160b of the second wireless device 150b and/or the angular spread 170b of the direction 160b to the second wireless device 150b is within the angular spread 170a of the direction 160a to the first wireless device 150a. If thus is true, there is an overlap and the hypothesis is rejected, as in step S108a. If this is not true then the hypothesis could be kept and step S108b and/or step S108c is entered. Hence, according to an embodiment the network node 200 is configured to perform step S108b and/or step S108c:

S108b: The network node 200 keeps the hypothesis of co-scheduling the first wireless device 150a and the second wireless device 156b when the direction 160b of the second wireless device 150b is outside the angular spread 170a of the direction 160a to the first wireless device 150a.

S108c: The network node 200 keeps the hypothesis of co-scheduling the first wireless device 150a and the second wireless device 150b when the angular spread 170b of the second wireless device 150b is outside the angular spread 170a of the direction 160a to the first wireless device 150a.

Steps S108b, S108c cannot be entered if the conditions of rejecting the hypothesis in step S108a are fulfilled. In some aspects, the hypothesis is kept only when the conditions of both steps S108b, S108c are fulfilled. Thus, a conditioning for entering step S108c could be that the conditions in step S108b are true; and vice versa since the order in which steps S108b and S108c are performed is irrelevant.

There could be different ways for the network node 200 to act after having rejected the hypothesis in step S108a. For example, the network node 200 could search for another wireless device 150c, 150d to be a candidate for co-scheduling with the first wireless device 150a Band vice versa for the second wireless device 150b. Hence, according to an embodiment the network node 200 is configured to perform step S110 after having rejected the hypothesis in step S108a:

S110: The network node 200 finds another wireless device 150c, 150d to co-schedule with the first wireless device 150a. At least step S104 and any of steps S108, S108a, S108b, S108c could then be repeated with the second wireless device 150a having been replaced by the wireless device 150c, 150d found in step S110.

The precoder for the first wireless device could be selected based on reported PMIs. In some aspects, the used precoder is the precoder that corresponds to the PMI reported by the first wireless device. Hence, according to an embodiment the first wireless device 150a is scheduled according to the PMI report of the first wireless device 150a. In other aspects, PMI reported from co-scheduled wireless devices are also used for designing a precoder that tries to null inter-user interference. In this way, the fast fading variations is taken into account when determining precoding weights. Hence, according to an embodiment the second directional information is obtained from a PMI report of the second wireless device 150b, and the first wireless device 150a is scheduled based on the PMI report of the first wireless device 150a and the PMI report of the second wireless device 150b.

In some aspects, the angular spread is estimated from uplink measurements, thus utilizing reciprocity. In other aspects, feedback is used to estimate angular spread. Hence, according to an embodiment the angular spread 170a is determined from at least one of uplink signals, channel state information, CSI, reports, feedback reports, and reference signal received power, RSRP, reports. Further, the uplink signals, CSI reports, feedback reports, and RSRP could be received from the first wireless device 150a. This can be achieved by configuring the wireless devices to report two or more of the strongest PMIs and corresponding CQIs.

For ease of exposition, embodiments relating to determining the angular spread will now be described in more detail for the azimuth dimension only, but as the skilled person would appreciate, the embodiments can be applied similarly in the elevation dimension or in a joint azimuth-elevation domain.

According to embodiments the angular spread 170a is determined from a directional power spectrum. In some aspects, the azimuth-directional power spectrum for a wireless device is estimated according to:

$$P(\phi) = \frac{a^H(\phi)\hat{R}a(\phi)}{a^H(\phi)a(\phi)}$$

Here, a($\phi$) is the (known) array response vector, and $$\hat{R} = \frac{1}{N}\sum_{n=1}^{N} x(n)x^H(n)$$

is a sample covariance matrix calculated from received signals x(n) sent by the wireless device in the uplink. The notation $\Sigma_{n=1}^{N} z(n)$ denotes summation over the variable z(n) from index n=1 to index n=N. The index n can represent frequency, time or both frequency and time. For example, in LTE the index n can represent subcarrier number, subframe number, or a concatenation of subcarrier and subframe numbers. The signals x(n) can for example be uplink sounding signals such as Sounding Reference Signals (SRSs) in LTE or previous uplink data transmissions. Statistics can be gathered during a long period of time since the spatial characteristics of the physical environment in which the transmission point 120 operates can be considered static.

The angular spread 170a, 170b is caused by a radio propagation channel between the transmission point 120 and the respective wireless devices. Hence, according to an embodiment the network node is configured to determine the angular spread 170a as in step S106a:

S106a: The network node 200 determines the angular spread 170a of the direction 160a to the first wireless device 150a as caused by a radio propagation channel between the transmission point 120 of the network node 200 and the first wireless device 150a.

Further, according to an embodiment the network node is configured to determine the angular spread 170b as in step S106b:

S106b: The network node 200 determines the angular spread 170b of the direction 16a to the second wireless device 150b as caused by a radio propagation channel between the transmission point 120 of the network node 200 and the second wireless device 150b.

Azimuth angular spread could, for example, be estimated based on the estimated power spectrum and reported PMI according to:

$$\sigma_{\phi,PMI} = \sqrt{\frac{\int |\exp(j\phi) - \exp(j\phi_{PMI})|^2 P(\phi)d\phi}{\int P(\phi)d\phi}}$$

Here, $\phi_{PMI}$ is the azimuth angle corresponding to a given PMI. One reason for using the expression exp(j$\phi$) (where exp(j$\phi$) represents the exponential function with argument j$\phi$ and where j denotes the imaginary unit) in the angular spread calculation is to avoid possible ambiguities due to the periodicity of the azimuth angle. The notation $\int P(\phi)d\phi$ represents the integral of P($\phi$) over the variable $\phi$.

There could be multiple definitions of, and ways to, estimate the angular spread of a channel and that other definitions than the one presented herein may be used. In some aspects, the angular spread is estimated per wireless device, and $\phi_{PMI}$ is the azimuth angle corresponding to the PMI reported by the wireless device. That is, according to an embodiment the first directional information (of the first wireless device 150a) is obtained from a PMI report. The PMI report could be received from the first wireless device 150a. In another embodiment, angular spread is calculated per PMI regardless of which wireless device that has reported a particular PMI.

The power spectrum and angular spread corresponding to a certain PMI can be determined from signals received from several different wireless devices that have reported the same PMI, thereby increasing the statistical accuracy. Hence, according to an embodiment the uplink signals, CSI reports, feedback reports, and RSRP are received from a further wireless device, the further wireless device indicating same direction of transmission as the first wireless device 150a. This is a viable approach if the angular spread as seen from the transmission point 120 is similar for different wireless devices that have similar main directions of the channel energy. In order not to mix wireless devices having channels with different spatial characteristics, although they have reported the same PMI, the set of wireless devices that are allowed to contribute to the determination of the angular spread could be restricted by requiring the set of wireless devices to be at a similar distance from the transmission point 120. Distance information for can be obtained from timing advance and/or positioning estimates.

In other aspects, the angular spread is estimated from multiple PMIs and CQIs reported by a wireless device. Hence, according to an embodiment the angular spread 170a is determined based on at least two PMI reports of the first wireless device 150a and/or at least two CQI reports of the first wireless device 150a. As an example, the angular spread $\sigma_{\phi,PMI,0}$ could be determined according to:

$$\sigma_{\phi,PMI,0} = \sqrt{\frac{\sum_{k \neq 0} |\exp(j\phi_{PMI,k}) - \exp(j\phi_{PMI,0})|^2 CQI_k}{\sum_{k \neq 0} CQI_k}}$$

Here, $\phi_{PMI,0}$ is the angle corresponding to the strongest PMI reported by the wireless device, and the wireless device is assumed to be configured to report a number of the strongest PMIs. In some aspects, the wireless device has been configured with a further criterion that the reported PMIs should correspond to orthogonal beams. Hence, according to an embodiment the at least two PMI reports correspond to mutually orthogonal transmission beams.

In other aspects, the wireless device may be configured to measure on a set of Discovery Reference Signals (DRSs) or beam-formed. CSI-RSs, and report back Reference Signal Received Power (RSRP) measurements, where each DRS is beamformed towards a separate azimuth angle $\phi$. The wireless device may then be configured to report RSRP for a DRS if the RSRP exceeds a certain threshold, and thus the network node may obtain multiple RS RP reports corresponding to different azimuth angles $\phi$. The angular spread may then be estimated similarly as for the multiple PMI scenario disclosed above.

In some aspects co-scheduling restrictions are based on the estimated angular spreads. Assume the first wireless device has reported a PMI that corresponds to an angle $\phi_{PMI,0}$. To this PMI, a forbidden angular interval [$\phi_{PMI,A}$−c·$\sigma_{\phi,PMI,A}$ $\phi_{PMI,A}$+c·$\sigma_{\phi,PMI,A}$] is assigned. Here, c is a design parameter than can be set a priori, e.g. to ½ or ¼, or be tuned during system operation.

Figure 5:
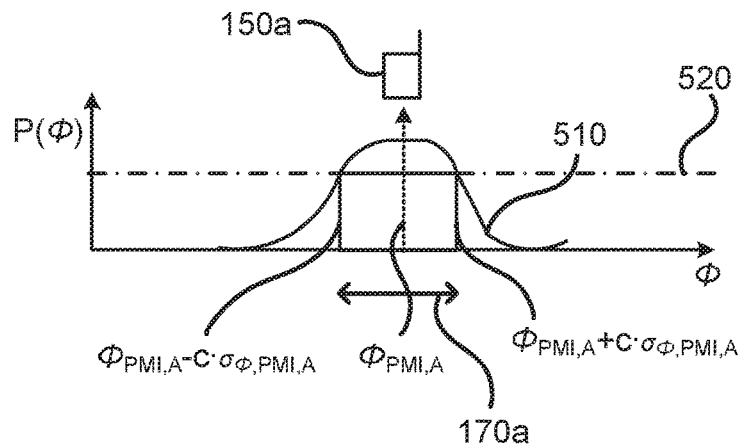
FIGS. 5, 6, 7, 8, and 9 schematically illustrate power spectra according to embodiments.

In FIG. 5, a forbidden angular interval as given by the angular spread 170a for wireless device 150a is illustrated schematically together with an illustrative power spectrum 510. A forbidden angular interval could be defined by angles for which the power spectrum 510 exceeds the threshold value 520. Any wireless devices that have reported a PMI that has an angle within the forbidden angular interval are not allowed to be co-scheduled with the first wireless device.

In other aspects, the angular spread is assumed to be asymmetric around the reported PMI. In this case, two angular spread values for the first wireless device are determined; a left-hand angular spread $\sigma_{\phi,PMI,L}$ and a right-hand angular spread $\sigma_{\phi,PMI,R}$, according to:

$$\sigma_{\phi,PMI,L} = \sqrt{\frac{\int_{\phi=-\pi/2}^{\phi_{PMI}} |\exp(j\phi) - \exp(j\phi_{PMI})|^2 P(\phi)d\phi}{\int_{\phi=-\pi/2}^{\phi_{PMI}} P(\phi)d\phi}}$$

$$\sigma_{\phi,PMI,R} = \sqrt{\frac{\int_{\phi=\phi_{PMI}}^{\pi/2} |\exp(j\phi) - \exp(j\phi_{PMI})|^2 P(\phi)d\phi}{\int_{\phi=\phi_{PMI}}^{\pi/2} P(\phi)d\phi}}$$

The forbidden angular interval for the first wireless device is then expressed as: $[\phi_{PMI,A} - c \cdot \sigma_{\phi,PMI,A}\ \phi_{PMI,A} + c \cdot \sigma_{\phi,PMI,R,A}]$.

According to an embodiment the angular spread 170a of the direction to the first wireless device 150a is determined according to the center of gravity of the directional power spectrum. As an example, the angular spread $\sigma_{\phi,PMI}$ is determined as:

$$\sigma_{\phi,PMI} = \sqrt{\frac{\int |\exp(j\phi) - \mu_\phi|^2 P(\phi)d\phi}{\int P(\phi)d\phi}}$$

Here, $$\mu_\phi = \frac{\int \exp(j\phi) P(\phi) d\phi}{\int P(\phi) d\phi}$$

is the center of gravity of the angular power spectrum for a wireless device that has reported a particular PMI. In this scenario, the forbidden angular interval is defined relative to $\mu_\phi$ instead of $\phi_{PMI}$. This embodiment can also be generalized to an asymmetric power spectrum by calculating a left-hand angular spread and right-hand angular spread according to the description above.

Figure 6:
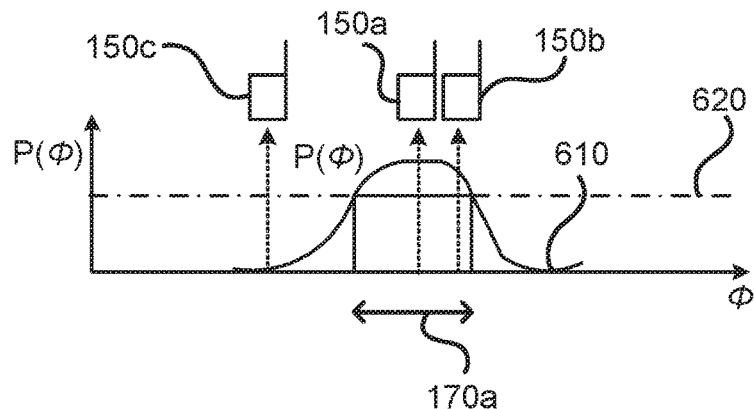

FIG. 6 a forbidden angular interval as given by the angular spread 170a for wireless device 150a is illustrated schematically together with an illustrative power spectrum 610. A forbidden angular interval could be defined by angles for which the power spectrum 610 exceeds the threshold value 620. FIG. 6 further illustrates corresponding PMI angles for a second wireless device 150b and a third wireless device 150c. The second wireless device is not allowed to be co-scheduled with the first wireless device since its PMI is in the forbidden angular interval of the first wireless device. The third wireless device is allowed to be co-scheduled with the first wireless device if not the PMI of the first wireless device is within the forbidden angular interval (not shown) of the third wireless device.

The propagation channel may consist of several disjoint clusters with significant channel energy. Each of these clusters could give rise to an angular spread region. This is illustrated schematically in FIG. 7, where a power spectrum having three clusters is shown, each giving rise to a respective angular spread region 170aa, 170ab, 170ac. Hence, according to an embodiment the angular spread 170a of the direction to the first wireless device 150a is divided into at least two isolated angular spread regions 170aa, 170ab, 170ac.

Multiple forbidden angular intervals for a wireless device could be defined by thresholding the angular power spectrum. That is, according to an embodiment the at least two isolated angular spread regions 170aa, 170ab, 170ac have directional power spectrum values above a power threshold value 720. Forbidden angular intervals are thus defined by angles for which the power spectrum 710 exceeds the threshold value 720. If the spectrum has many narrow peaks, smoothing may be applied to the spectrum (e.g. by low-pass filtering of the spectrum) before the thresholding.

Figure 7:
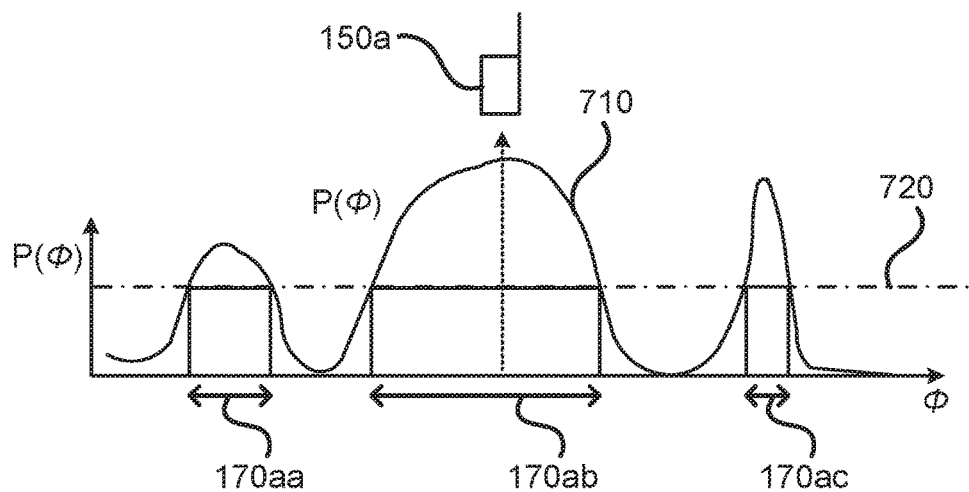
Figure 8:
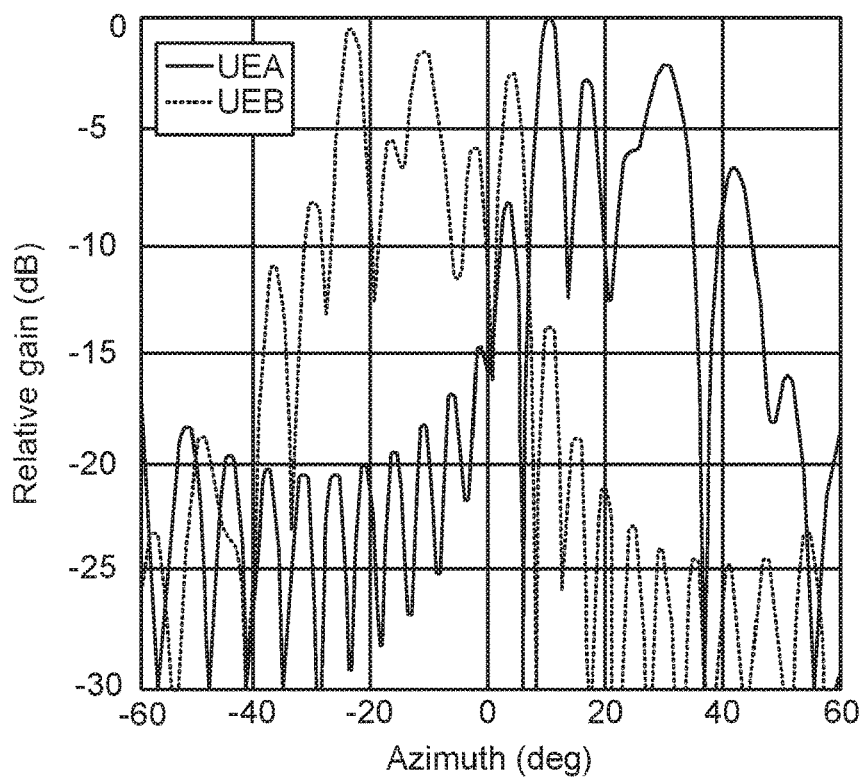
Figure 9:
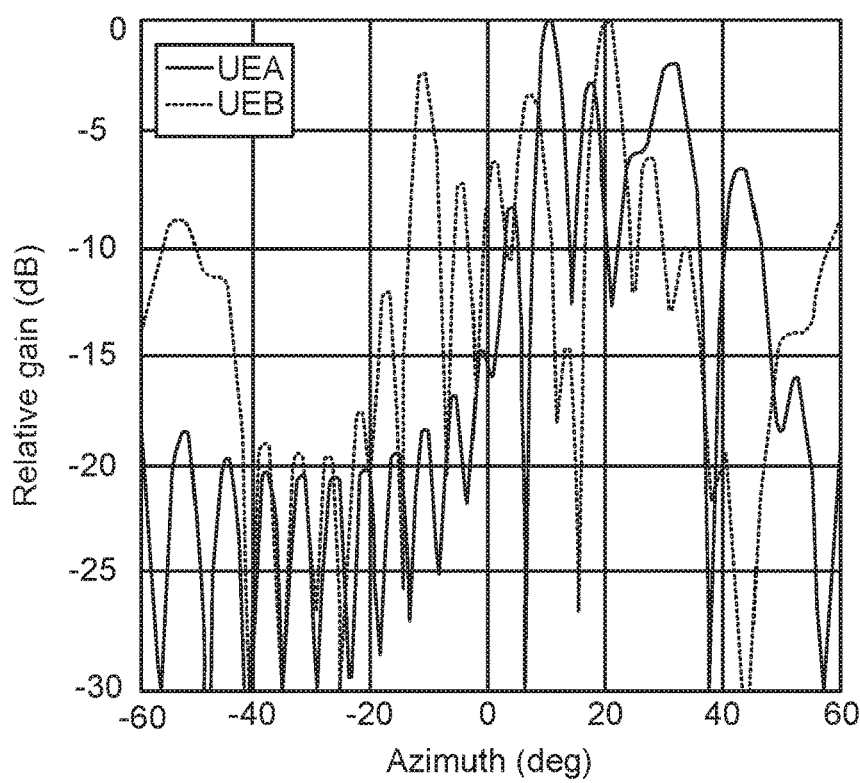

FIGS. 8 and 9 give examples of more realistic power spectra than those of FIGS. 5, 6, and 7. FIGS. 8 and 9 show channel realizations obtained from the ITU urban macro spatial channel model as described in "Guidelines for evaluation of radio interface technologies for IMT-Advanced, ITU-R M.2135-1".

FIG. 8 shows channel realizations for a first wireless device and a second wireless device (denoted UEA and UEB, respectively) that are allowed to be co-scheduled. Assume the first wireless device has reported a PMI with azimuth angle=10° since this is the strongest direction in its channel. The angular spread is in this case 50°. Correspondingly for the second wireless device, its PMI angle and angular spread is −24° and 80°, respectively. Defining forbidden angular intervals according to $[\phi_{PMI,A} - c \cdot \sigma_{\phi,PMI,A}\ \phi_{PMI,A} + c \cdot \sigma_{\phi,PMI,A}]$, with c=¼, a forbidden angular interval for the first wireless device is obtained as [−2.5° 22.5°], and a forbidden angular interval for the second wireless device is obtained as [−44° 4°]. Hence, the PMI for the first wireless device is outside the forbidden angular interval of the second wireless device, and the PMI of the second wireless device is outside the forbidden angular interval of the first wireless device. Therefore, the first wireless device and the second wireless device are allowed to be co-scheduled (or at least the hypothesis of co-scheduling the first wireless device and the second wireless device is not rejected).

FIG. 9 shows channel realizations for a first wireless device and a second wireless device (denoted UEA and UEB, respectively) that are not allowed to be co-scheduled. The channel realization for the first wireless device is the same as in FIG. 8, but for FIG. 9 the second wireless device has its strongest direction at 20°. The angular spread for the second wireless device is 42° and its forbidden angular interval is [9.5° 30.5°] using the same definition as in the example for FIG. 8. Since the PMI of the first wireless device is inside the forbidden angular interval of the second wireless device (and vice versa), co-scheduling of the first wireless device and the second wireless device is not allowed.

Figure 10:
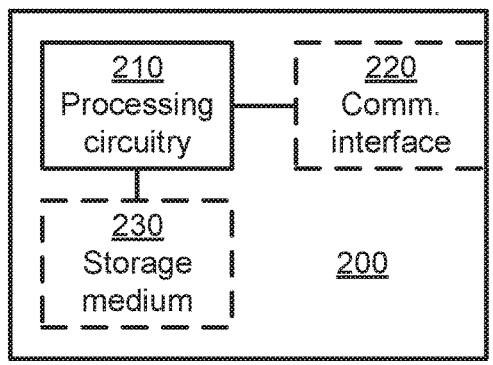
FIG. 10 is a schematic diagram showing functional units of a network node according to an embodiment.

FIG. 10 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S110, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with the wireless devices 150a-150d as well as devices and entities of the communications network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
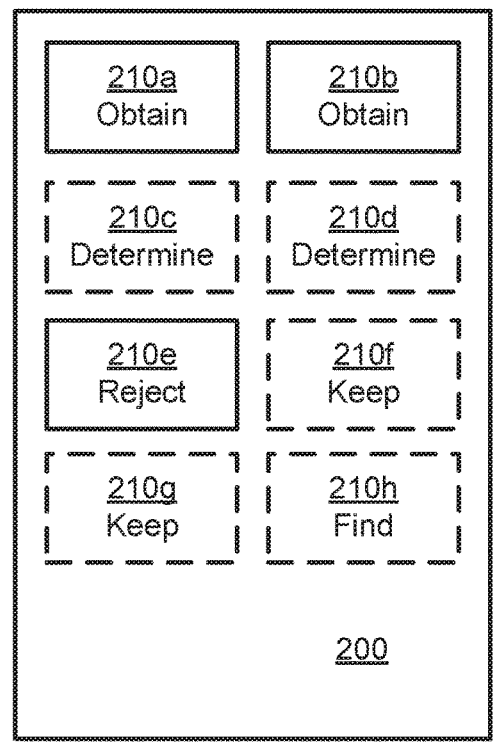
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a number of functional modules; an obtain module 210a configured to perform step S102, an obtain module 210b configured to perform step S104, and a reject module 210e configured to perform step S108a. The network node 200 of FIG. 11 may further comprise a number of optional functional modules, such as any of a determine module 210e configured to perform step S106a, a determine module 210d configured to perform step S106b, a keep module 210f configured to perform step S108b, a keep module 210g configured to perform step S108c, and a find module 210h configured to perform step S110.

In general terms, each functional module 210a-210h may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

The network node 200 may be provided as a standalone device or as a part of at least one further device. For example, the network node 200 may be provided in a node of the radio access network no or in a node of the core network 130. Alternatively, functionality of the network node 200 may be distributed between at least two devices, or nodes. These at least two nodes, or devices, may either be part of the same network part (such as the radio access network 110 or the core network 130) or may be spread between at least two such network parts. In general terms, instructions that are required to be performed in real time may be performed in a device, or node, operatively closer to the transmission point 120 than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210a-210h of FIG. 11 and the computer program 1220 of FIG. 12 (see below).

Figure 12:
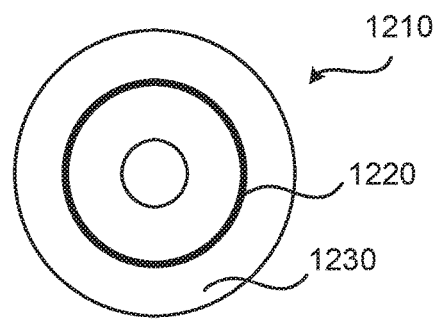
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for co-scheduling wireless devices in a communications network, the method being performed by a network node, the method comprising:
  obtaining a first precoding matrix indicator (PMI) transmitted by a first wireless device, wherein the first PMI corresponds to a first angle-of-arrival;
  obtaining a second PMI transmitted by a second wireless device, wherein the second PMI corresponds to a second angle-of-arrival;
  estimating a first angular spread associated with the first wireless device;
  estimating a second angular spread associated with the second wireless device;
  determining, based on the first angle-of-arrival and the estimated first angular spread, a first forbidden angular interval associated with the first wireless device;

determining, based on the second angle-of-arrival and the estimated second angular spread, a second forbidden angular interval associated with the second wireless device, wherein the second forbidden angular interval is different than the first forbidden angular interval;

storing first angular interval information specifying the determined first forbidden angular interval;

storing second angular interval information specifying the determined second forbidden angular interval, wherein the second angular interval information is different than the first angular interval information;

using the second forbidden angular interval information, determining whether the first angle-of-arrival is within the second forbidden angular interval;

using the first forbidden angular interval information, determining whether the second angle-of-arrival is within the first forbidden angular interval; and accepting a hypothesis of co-scheduling the first wireless device and the second wireless device after determining that i) the first angle-of-arrival is not within the second forbidden angular interval and ii) the second angle-of-arrival is not within the first forbidden angular interval.

2. The method of claim 1, wherein estimating the first angular spread comprises estimating the angular spread based on channel state information (CSI) reports.

3. The method of claim 1, wherein estimating the first angular spread comprises estimating the angular spread based on uplink signals.

4. The method of claim 1, wherein the first wireless device is scheduled according to the PMI report of the first wireless device.

5. The method of claim 1, wherein estimating the angular spread of the radio channel between the transmission point and the first wireless device comprises estimating the angular spread based on any one or more of: uplink signals, channel state information (CSI) reports, feedback reports, and reference signal received power (RSRP) reports.

6. The method of claim 5, wherein the uplink signals, CSI reports, feedback reports, and RSRP are received from the first wireless device.

7. The method of claim 5, wherein the uplink signals, CSI reports, feedback reports, and RSRP are received from a further wireless device, the further wireless device indicating same direction of transmission as the first wireless device.

8. The method of claim 1, wherein estimating the first angular spread comprises estimating the first angular spread based on at least two precoding matrix indicator (PMI) reports of the first wireless device and/or at least two channel quality indicator (CQI) reports of the first wireless device.

9. The method of claim 8, wherein the at least two PMI reports correspond to mutually orthogonal transmission beams.

10. The method of claim 1, further comprising estimating a directional power spectrum, wherein estimating the first angular spread comprises estimating the first angular spread based on the estimated directional power spectrum.

11. The method of claim 1, further comprising estimating a directional power spectrum, wherein estimating the first angular spread comprises estimating the first angular spread based on a center of gravity of the estimated directional power spectrum.

12. The method of claim 1, wherein the estimated first angular spread is divided into at least two isolated angular spread regions.

13. The method of claim 12, wherein the at least two isolated angular spread regions have directional power spectrum values above a power threshold value.

14. The method of claim 1, wherein the communications network is a frequency-division duplex communications network.

15. A network node for co-scheduling wireless devices in a communications network, the network node comprising:
a transmitter;
a receiver; and
processing circuitry, the processing circuitry being configured to cause the network node to:
obtain a first precoding matrix indicator (PMI) transmitted by a first wireless device, wherein the first PMI corresponds to a first angle-of-arrival;
obtain a second PMI transmitted by a second wireless device, wherein the second PMI corresponds to a second angle-of-arrival;
estimate a first angular spread associated with the first wireless device;
estimate a second angular spread associated with the second wireless device;
determine, based on the first angle-of-arrival and the estimated first angular spread, a first forbidden angular interval associated with the first wireless device;
determine, based on the second angle-of-arrival and the estimated second angular spread, a second forbidden angular interval associated with the second wireless device, wherein the second forbidden angular interval is different than the first forbidden angular interval;
store first angular interval information specifying the determined first forbidden angular interval;
store second angular interval information specifying the determined second forbidden angular interval, wherein the second angular interval information is different than the first angular interval information;
use the second forbidden angular interval information, determining whether the first angle-of-arrival is within the second forbidden angular interval;
use the first forbidden angular interval information, determining whether the second angle-of-arrival is within the first forbidden angular interval; and
accept a hypothesis of co-scheduling the first wireless device and the second wireless device after determining that i) the first angle-of-arrival is not within the second forbidden angular interval and ii) the second angle-of-arrival is not within the first forbidden angular interval.

16. A network node for co-scheduling wireless devices in a communications network, the network node comprising:
processing circuitry; and
a non-transitory storage medium storing instructions that, when executed by the processing circuitry, cause the network node to:
obtain a first precoding matrix indicator (PMI) transmitted by a first wireless device, wherein the first PMI corresponds to a first angle-of-arrival;
obtain a second PMI transmitted by a second wireless device, wherein the second PMI corresponds to a second angle-of-arrival;
estimate a first angular spread associated with the first wireless device;
estimate a second angular spread associated with the second wireless device;
determine, based on the first angle-of-arrival and the estimated first angular spread, a first forbidden angular interval associated with the first wireless device;

determine, based on the second angle-of-arrival and the estimated second angular spread, a second forbidden angular interval associated with the second wireless device, wherein the second forbidden angular interval is different than the first forbidden angular interval;

store first angular interval information specifying the determined first forbidden angular interval;

store second angular interval information specifying the determined second forbidden angular interval, wherein the second angular interval information is different than the first angular interval information;

use the second forbidden angular interval information, determining whether the first angle-of-arrival is within the second forbidden angular interval;

use the first forbidden angular interval information, determining whether the second angle-of-arrival is within the first forbidden angular interval; and accept a hypothesis of co-scheduling the first wireless device and the second wireless device after determining that i) the first angle-of-arrival is not within the second forbidden angular interval and ii) the second angle-of-arrival is not within the first forbidden angular interval.

17. A computer program product comprising a non-transitory computer readable medium comprising a computer program for co-scheduling wireless devices in a communications network, the computer program comprising computer code which, when run on processing circuitry of a network node, causes the network node to:

obtain a first precoding matrix indicator (PMI) transmitted by a first wireless device, wherein the first PMI corresponds to a first angle-of-arrival;

obtain a second PMI transmitted by a second wireless device, wherein the second PMI corresponds to a second angle-of-arrival;

estimate a first angular spread associated with the first wireless device;

estimate a second angular spread associated with the second wireless device;

determine, based on the first angle-of-arrival and the estimated first angular spread, a first forbidden angular interval associated with the first wireless device;

determine, based on the second angle-of-arrival and the estimated second angular spread, a second forbidden angular interval associated with the second wireless device, wherein the second forbidden angular interval is different than the first forbidden angular interval;

store first angular interval information specifying the determined first forbidden angular interval;

store second angular interval information specifying the determined second forbidden angular interval, wherein the second angular interval information is different than the first angular interval information;

use the second forbidden angular interval information, determining whether the first angle-of-arrival is within the second forbidden angular interval;

use the first forbidden angular interval information, determining whether the second angle-of-arrival is within the first forbidden angular interval; and accept a hypothesis of co-scheduling the first wireless device and the second wireless device after determining that i) the first angle-of-arrival is not within the second forbidden angular interval and ii) the second angle-of-arrival is not within the first forbidden angular interval.

18. The method of claim 10, wherein estimating the first angular spread comprises estimating the first angular spread based on the estimated directional power spectrum and the first PMI.

19. The method of claim 10, wherein estimating the directional power spectrum comprises estimating the directional power spectrum based on a covariance matrix calculated based on received signals.

20. The method of claim 1, estimating the first angular spread comprises estimating the first angular spread based on the angle of arrival corresponding to the first PMI, a first channel quality indicator (CQI), and a second CQI.

21. The method of claim 1, further comprising:

determining a third forbidden angular interval associated with the first wireless device; and determining whether the second angle-of-arrival is within the third forbidden angular interval, wherein the hypothesis of co-scheduling the first wireless device and the second wireless device is accepted only after determining that i) the first angle-of-arrival is not within the second forbidden angular interval, ii) the second angle-of-arrival is not within either the first or third forbidden angular intervals.

* * * * *